(No Model.)

C. E. K. ANDERSSON.
FLY CATCHER.

No. 404,946. Patented June 11, 1889.

Witnesses
O. J. Morgan
W. P. Earll

Carl E. K. Andersson, Inventor
By his Attorney A. P. Thayer.

UNITED STATES PATENT OFFICE.

CARL E. K. ANDERSSON, OF NEW YORK, N. Y.

FLY-CATCHER.

SPECIFICATION forming part of Letters Patent No. 404,946, dated June 11, 1889.

Application filed April 15, 1889. Serial No. 307,370. (No model.)

*To all whom it may concern:*

Be it known that I, CARL E. K. ANDERSSON, a citizen of Sweden, residing at New York city, in the county and State of New York, have invented certain new and useful Improvements in Fly-Catchers; and I do hereby declare the following to be a full, clear, and exact description of the invention, such as will enable others skilled in the art to which it appertains to make and use the same.

My improved fly-catcher consists of a dip-net with a funnel-trap at the mouth, offering but little or no obstruction to the entry of the flies or other insects to be caught, but preventing their escape, and made to open and close at the other end to facilitate the removal of the catch, as hereinafter fully described, reference being made to the accompanying drawings, in which—

Figure 1:
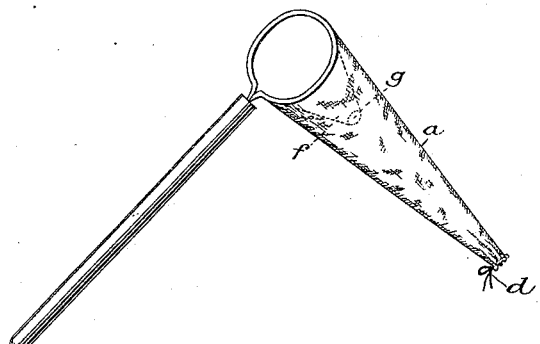
Figure 2:
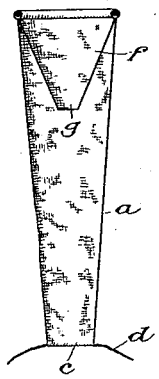

Figure 1 is a perspective view of my improved fly-catcher, and Fig. 2 is a sectional elevation of the same.

I make the body $a$ of the net about the same as such nets are made of light netting for catching flies and other flying insects, but somewhat larger at the bottom, and so that said bottom may be opened, as at $c$, and with a gathering or lacing cord $d$ to close it when desired, and in the mouth I arrange the short funnel-trap $f$, of like material, the mouth of which is joined to the mouth of the body $a$, while the rest of it extends a short distance into said body and terminates with the small open passage at $g$, through which the air gathered into the body $a$ by the motion of the net in use carries the insects into the larger space in the body, and thus forming a trap, preventing escape from the net and retaining the catch for removal at convenience through the other end, said net being connected at the mouth to the hoop of the staff.

The funnel $f$ may of course be detachably connected to the mouth of the body $a$, so that it can be removed for opening the net to discharge the catch; but it is preferred to have the opening in the other end, as shown.

It will be seen that no care is necessary in handling the net to avoid the escape of the insects caught while catching others, whereas in the use of the common net they must be removed at once, or, if retained, the net must be the subject of watchful care, and at best the insects are liable to injury in the folds of the net necessary for retaining them.

I claim as my invention—

The improved fly-net consisting of a dip-net of fine netting having the open end attached to the wire hoop of the staff and the drawn or gathered open bottom end and the funnel-trap of like material in the mouth of the net, all combined and arranged substantially as described.

In testimony whereof I affix my signature in presence of two witnesses.

CARL E. K. ANDERSSON.

Witnesses:
 JEAN A. JOHNSON,
 VICTOR ALMQVIST.